United States Patent
Yoshioka et al.

(10) Patent No.: US 8,240,222 B2
(45) Date of Patent: Aug. 14, 2012

(54) ELECTRICALLY DRIVEN LINEAR ACTUATOR

(75) Inventors: Morihisa Yoshioka, Iwata (JP); Keisuke Kazuno, Iwata (JP)

(73) Assignee: NTN Corporation (JP)

( * ) Notice: Subject to any disclaimer, the term of this patent is extended or adjusted under 35 U.S.C. 154(b) by 480 days.

(21) Appl. No.: 11/354,342

(22) Filed: Feb. 14, 2006

(65) Prior Publication Data
US 2006/0196291 A1    Sep. 7, 2006

(30) Foreign Application Priority Data
Feb. 14, 2005 (JP) .................... 2005-035803

(51) Int. Cl.
*F16H 3/06* (2006.01)
*F16H 1/24* (2006.01)

(52) U.S. Cl. .................. 74/89.23; 74/424.75; 74/424.83

(58) Field of Classification Search .......... 74/424.71, 74/424.75, 424.81, 424.82, 424.83, 424.86, 74/424.79, 89.23, 89.44
See application file for complete search history.

(56) References Cited

U.S. PATENT DOCUMENTS

| | | | | |
|---|---|---|---|---|
| 2,978,920 A | * | 4/1961 | Sears et al. | 74/441 |
| 3,638,507 A | * | 2/1972 | Orner | 74/89.42 |
| 3,722,312 A | * | 3/1973 | Better et al. | 74/89.42 |
| 5,492,030 A | * | 2/1996 | Benton et al. | 74/441 |
| 5,501,118 A | * | 3/1996 | Benton | 74/441 |

FOREIGN PATENT DOCUMENTS

| | | |
|---|---|---|
| JP | 4-22638 | 2/1992 |
| JP | 2004-84827 | 3/2004 |
| JP | 2004-223656 | 8/2004 |
| JP | 2004-245257 | 9/2004 |

* cited by examiner

*Primary Examiner* — Thomas R Hannon
*Assistant Examiner* — Alan Waits
(74) *Attorney, Agent, or Firm* — Harness, Dickey & Pierce, P.L.C.

(57) ABSTRACT

An electrically driven linear actuator with a smooth motion of a ball screw provides an even load distribution as well as a stable motion of the balls and has an electric motor (5) mounted on a housing (4). A nut (8 or 16), adapted to mate with the screw shaft (7), has a pair of supporting portions (14) at an axially central position on the outer circumferential surface of the nut (8 or 16) to engage one end of a link (2). The nut (8, 16) is formed with a screw groove (8a). Oval bridge windows (10) are formed in the nut (8 or 16) through a wall with a portion of the screw groove (8a) cut out over a distance of at least two pitches of the screw grooves (8a). A bridge member (11), forming the circulating member, is fitted in each of the bridge windows (10).

3 Claims, 5 Drawing Sheets

(a)

(b)

(a)

(b)

ELECTRICALLY DRIVEN LINEAR ACTUATOR

CROSS-REFERENCE TO RELATED APPLICATIONS

This application claims priority to Japanese Patent Application No. 2005-035803, filed Feb. 14, 2005, which application is herein expressly incorporated by reference.

1. Field

The present disclosure relates to electrically driven linear actuators used in a drive train such as a brake, engine or transmission of an automobile and, more particularly, to an electrically driven linear actuator which converts rotary motion, of an electric motor, to linear motion, via a ball screw mechanism.

2. Background

Electrically driven linear actuators are used in many kinds of driving mechanisms of a vehicle, such as an automobile, etc. The actuators usually use a gear mechanism, comprising a trapezoidal screw thread or a rack and pinion, as a mechanism to convert the rotary motion of the electric motor to linear motion in an axial direction. These converting mechanisms usually have sliding contact portions which include a power loss. This requires an increased size of the electric motor and thus, in turn, increases the power consumption. Accordingly, ball screw mechanisms have been increasingly used as a more efficient actuator.

Heretofore, in such an electrically driven linear actuator, a line of action of the driving side coincides with an axis of the ball screw and thus a pure axial load is applied to the ball screw. However, if the load applied to the ball screw is not a pure axial load, an appropriate mechanism such as a linear guide, is used to prevent the load from being directly applied to the ball screw.

In general industrial machine applications, where a relatively large space exists for the actuator since ordinarily no space requirements exist, a large degree of freedom exist for the arrangement and size of the structural parts of the electrically driven linear actuator. On the contrary, the space and the degree of freedom to mount the electrically driven actuator are strictly limited in the case of an engine compartment of an automobile. Thus, it is very difficult to incorporate the electrically driven linear actuator structure so that only pure axial load is applied to the ball screw.

To solve such a problem, an electrically driven linear actuator shown in FIG. 5 is known. This electrically driven linear actuator 50 generally includes a pair of links 51, a ball screw 52 to swingably drive a driven member via the links 51, and an electric motor 53 to drive the ball screw 52.

As shown in FIG. 6, the ball screw 52 includes a screw shaft 54 rotationally driven by the electric motor 53. A helical screw groove 54a is formed on its outer circumferential surface. A nut 55 is formed with a helical screw groove 55a, corresponding to the screw groove 54a, on its inner circumferential surface. The nut 55 is coupled with the screw shaft 54. A number of balls 56 are contained between the screw grooves 54a and 55a. A supporting shaft 57, to pivotably support the link 51 at its one end, is mounted on the nut 55, as shown in FIG. 5. The supporting shaft 57 is arranged so that it passes through the center of gravity of the nut 55 and is perpendicular to the axis of the screw shaft 54.

The ball screw 52 also includes a return tube 58 as a ball circulating member that forms an endless passage to circulate the balls 56 between the screw grooves 54a and 55a. The return tube 58 is mounted on the nut 55 at a side (a lower side in FIG. 6) opposite to a side (an upper side in FIG. 6) on which a radial component force "Fr" of a load "F" acts on the nut 55, via the supporting shaft 57.

Thus, it is possible to arrange a larger number of balls 56 at the upper side of the nut 55 in FIG. 6 than that present at the lower side of the nut 55 in FIG. 6. Thus, it is possible to prevent a reduction of the life of the ball screw 52, which would be caused by the radial component force "Fr" of a load "F" acting on the nut 55 via the supporting shaft 57 (see e.g. Japanese Laid-open Patent Publication No. 84827/2004).

In such a ball screw 52 of the electrically driven linear actuator 50 of the prior art, it is structured to improve the life of the ball screw 52 by arranging the return tube 58 on the side opposite to the side on which a radial component force "Fr" acts. It also arranges a larger number of balls at the side on which the radial component force "Fr" acts. In such an electrically driven linear actuator, it is required to be compact. However, this is not accomplished since the return tube 58 is mounted on the outer circumferential surface of the nut 55 in a bulky manner. In addition, another problem is that the ball load distribution is uneven and thus motion of balls 56 would be unstable and lack smoothness.

SUMMARY

It is, therefore, an object to provide an electrically driven linear actuator which can solve the problems of the prior art. The present actuator provides a smooth motion of the ball screw while providing an even load distribution as well as a stable motion of the balls.

Accordingly, an electrically driven linear actuator comprises an electric motor mounted on a housing. A screw shaft is coaxially connected to a motor shaft of the electric motor. A screw groove is formed on its outer circumferential surface. A nut is adapted to mate with the screw shaft. The nut has a pair of supporting portions at an axially central position on the outer circumferential surface of the nut. The supporting portions engage one end of a link. A screw groove, corresponding to the shaft screw groove, is formed on the inner circumferential surface of the nut. A number of balls are contained between the screw grooves. The ball circulating members are each formed with an endless ball circulating passage between the screw grooves. A ball screw converts rotary motion of the electric motor to axial motion and transmits a swing motion to the link. A pair of support bearings rotatably support the screw shaft, but the shaft is axially immovably relative to the housing. Oval bridge windows are formed in a barrel of the nut through a wall of the barrel. A portion of the screw groove is cut out over a distance of at least two pitches of the screw grooves. A bridge member, forming the circulating member, is fitted in each of the bridge window.

According to the electrically driven linear actuator, since the oval bridge windows are formed in the barrel of the nut through the wall of the barrel and a portion of the screw groove is cut out over a distance of at least two pitches of the screw grooves and the bridge member forms the circulating member and the bridge member is fitted into each of the bridge window, it is possible to reduce the load applied to the balls entering into the circulating area by the momentum load transmitted via the supporting portion. Also, it is possible to obtain a smooth operation of the ball screw brought by the even ball load distribution and the stable ball motion.

The bridge members are arranged at opposite ends of the nut. This makes it possible to increase the span of the ball circulating rows or threads. Thus, this further reduces the load applied to balls entering into the circulating area by the momentum load transmitted via the supporting portion.

The screw groove of the nut is formed by tapping. This makes it possible to improve the accuracy of configuration and lead of the screw groove.

An annular gouged portion is formed between the bridge windows of the nut. The inner diameter of the gouged portion is larger than that of the screw groove. This makes it possible to reduce the tapped area and thus to extend the life of the tapping tool. Also, it is possible to reduce the tapping cycle time and thus the manufacturing cost owing to reduction of cutting resistance. In addition, it is possible to further improve the accuracy of the screw groove since chips generated during the tapping process hardly enter between the tapping tool and the screw grooves.

The gouged portion is formed throughout a region between the bridge windows. This makes it possible to further reduce the tapped area to ensure a sufficient space to hold lubricating grease. Thus, this improves the endurance of ball screw.

The electrically driven linear actuator comprises an electric motor mounted on a housing. A screw shaft is coaxially connected to a motor shaft of the electric motor. The screw shaft is formed with a screw groove on its outer circumferential surface. A nut, adapted to mate with the screw shaft, has a pair of supporting portions at an axially central position on the outer circumferential surface of the nut to engage one end of a link. The nut is formed with a screw groove, corresponding to the shaft screw groove, on its inner circumferential surface. A number of balls are contained between the screw grooves. Ball circulating members, each being formed with an endless ball circulating passage, are positioned between the screw grooves. A ball screw converts rotary motion of the electric motor to axial motion and transmits a swing motion to the link. A pair of supporting bearings rotatably supports the screw shaft. However, the screw shaft is axially immovably relative to the housing. Oval bridge windows are formed in a barrel of the nut through a wall of the barrel. A portion of the screw groove is cut out over a distance of at least two pitches of the screw grooves. A bridge member, forming the circulating member, is fitted into each of the bridge window. According to the teachings, it is possible to reduce the load applied to balls entering into the circulating area by momentum load transmitted via the supporting portion. Also, it is possible to obtain a smooth operation of the ball screw brought by the even ball load distribution and the stable ball motion.

In order to carry out the present teachings, an electrically driven linear actuator comprises an electric motor mounted on a housing. A screw shaft is coaxially connected to a motor shaft of the electric motor. A screw groove is formed on the shaft outer circumferential surface. A nut, adapted to mate with the screw shaft, has a pair of supporting portions at an axially central position of the outer circumferential surface of the nut to engage one end of a link. A screw groove, corresponding to the shaft screw groove, is formed on the nut inner circumferential surface. A number of balls are contained between the screw grooves. Ball circulating members, each being formed with an endless ball circulating passage, are positioned between the screw grooves. A ball screw converts rotary motion of the electric motor to axial motion and transmits a swing motion to the link. A pair of supporting bearings rotatably supports the screw shaft. However, the screw shaft is axially immovably relative to the housing. Oval bridge windows are formed in a barrel of the nut through a wall of the barrel. A portion of the screw groove is cut out over a distance of at least two pitches of the screw grooves. A bridge member, forming the circulating member, is fitted in each of the bridge windows.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

Preferred embodiments of the present invention will be described with reference to the accompanying drawings.

Figure 1:
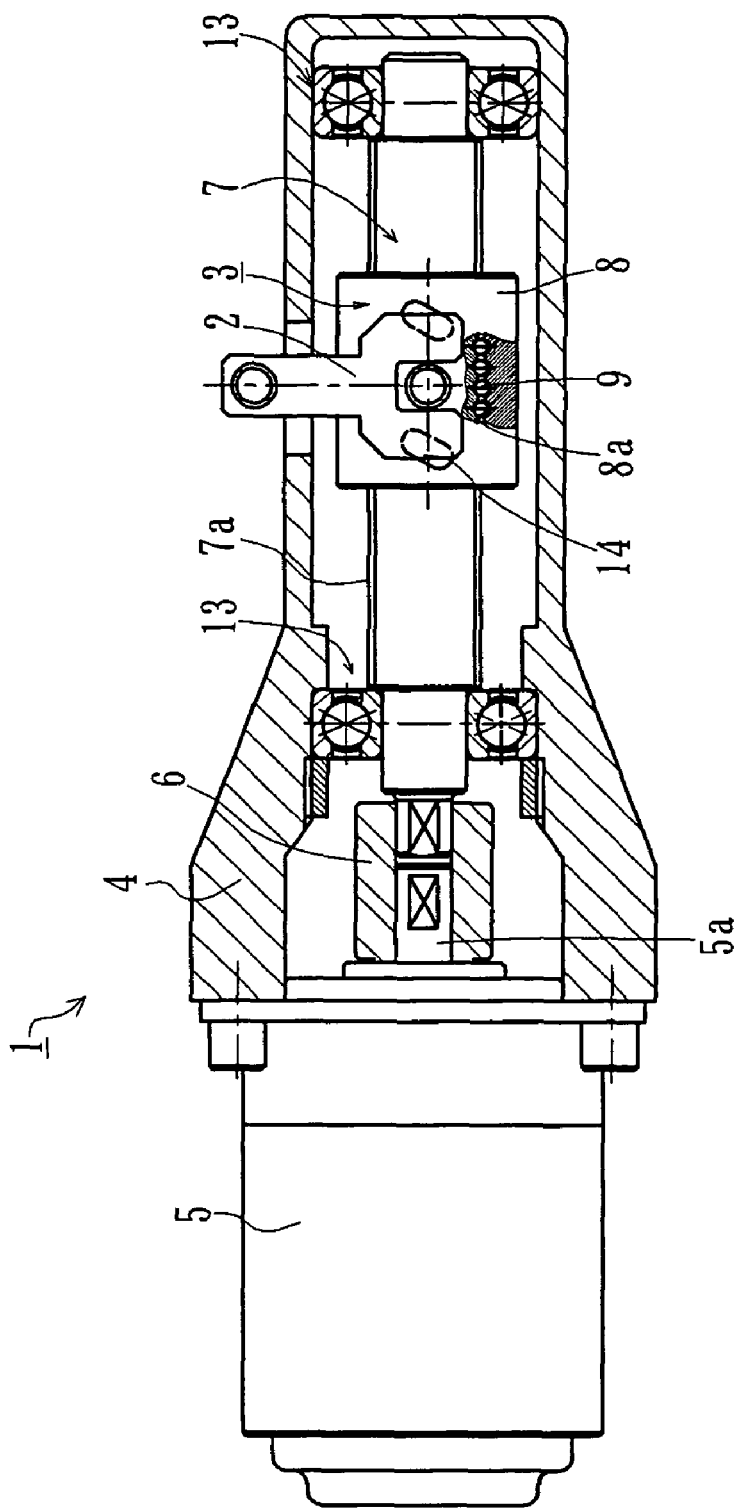
FIG. 1 is a longitudinal section view showing one embodiment of the electrically driven linear actuator of the present disclosure.

FIG. 1 is a longitudinal section view showing one embodiment of the electrically driven linear actuator. FIG. 2(a) is a longitudinal section view of a ball screw of FIG. 1. FIG. 2(b) is a perspective view of a bridge member of FIG. 1. FIG. 3(a) is a longitudinal section view of a nut of FIG. 1. FIG. 3(b) is a development view of the nut of FIG. 3(a).

The electrically driven linear actuator 1 includes a link 2, a ball screw 3 for swingably driving a driven member (not shown) via the link 2, and an electric motor 5 mounted on a housing 4.

Figure 2:
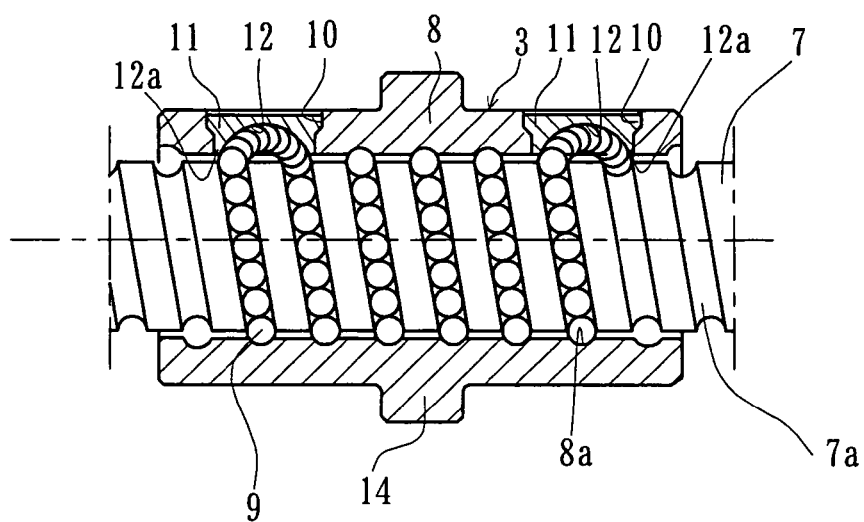
FIG. 2(a) is a longitudinal section view of a ball screw of FIG. 1.
FIG. 2(b) is a perspective view of a bridge member of FIG. 1.
Figure 2:
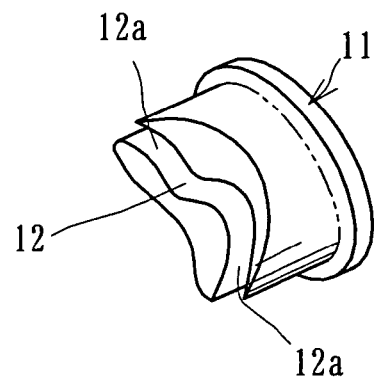

As shown in FIG. 2 (a), the ball screw 3 includes a screw shaft coaxially connected to a motor shaft 5a of the electric motor 5 via a coupling 6. A screw groove 7a is formed on the shaft outer circumferential surface. A nut 8 is formed with a screw groove 8a corresponding to the screw groove 7a of the screw shaft 7 on its inner circumferential surface. A number of balls 9 are contained between the screw grooves 7a and 8a. The cross-sectional configuration of the screw grooves 7a and 8a may be either a circular arc or a gothic arc configuration. However, the gothic arc configuration is preferable since it is possible to have a larger contact angle relative to the balls 9. Also, it is possible to set a small axial gap in order to increase the rigidity against the axial load and to suppress vibration.

Oval bridge windows 10 are formed in a barrel of the nut 8 through a wall of the barrel. A portion of the screw groove 8a is cut out. A bridge member 11, also having an oval configuration, is fitted in each of the bridge windows 10. As shown in FIG. 2(b), the bridge member 11 is formed with a connecting groove 12 to connect mutually adjacent screw grooves 8a. The connecting groove 12 and substantially one circumferential length of the screw groove 8a form a ball rolling passage. A number of balls 9 are interposed between the inner and outer screw grooves 7a and 8a. Within the ball rolling passage, the balls can roll along the screw grooves 7a and 8a and climb over a land of the screw groove 7a with being guided by the connecting groove 12 of the bridge member 11.

The balls then return to the adjacent screw groove 7a and again roll along the screw grooves 7a and 8a.

The connecting groove 12 of the bridge member 11 is formed in a "S" curved configuration so as to smoothly connecting the adjacent screw grooves 8a of the nut 8. Accordingly, opposite opened edges 12a of the connecting groove 12 are adapted to be connected to the screw groove 8a of the nut 8. Thus, they can correspond to the opened edges of the bridge window 10 of the adjacent screw grooves 8a of the nut 8. The depth of the connecting groove 12 is set so that balls 9 can climb over the land of the screw groove 7a within the connecting groove 12.

The bridge member 11 may be made of sintered alloy formed by an injection machine with injected plastically adjusted metal powder. In this injection molding process, firstly, metal powder and binder, comprising plastics and wax, are kneaded by a kneading machine. The kneaded material is then pelletized. Obtained pellets are fed to a hopper of the injection machine and formed into the bridge member 11 by pressing heat melted pellets into a mold. The metal powder is preferably material able to be sintered such as material comprising "C" (carbon) of 0.3 wt %, "Ni" (nickel) of 1~2 wt % and the remainder "Fe" (iron). Other injection moldable material such as "PA" (polyamide) may be used for making the bridge member 11.

As shown in FIG. 1, the screw shaft 7 is supported by a pair of supporting rotatable bearings 13 and 13. However, the shaft 7 is axially immovably relative to the housing 4. The nut 8 is provided with a pair of supporting shafts 14. The shafts 14 are axially centrally positioned on the outer circumferential surface of the nut. The shafts 14 are perpendicular to the axis of the screw shaft 7. Each of the shafts 14 rotatably supports one end of the link 2. Accordingly, the nut 8 is axially movably supported but rotationally immovable.

The screw shaft 7 is rotated in accordance with rotation of the electric motor 5. As this occurs, the nut 8 is moved axially (left and right directions in FIG. 1) by the rotation of the screw shaft 7. That is, the rotary motion of the motor shaft 5a is converted to axial motion of the nut 8, via the ball screw 3, and the link 2 is swingably moved.

Figure 3:
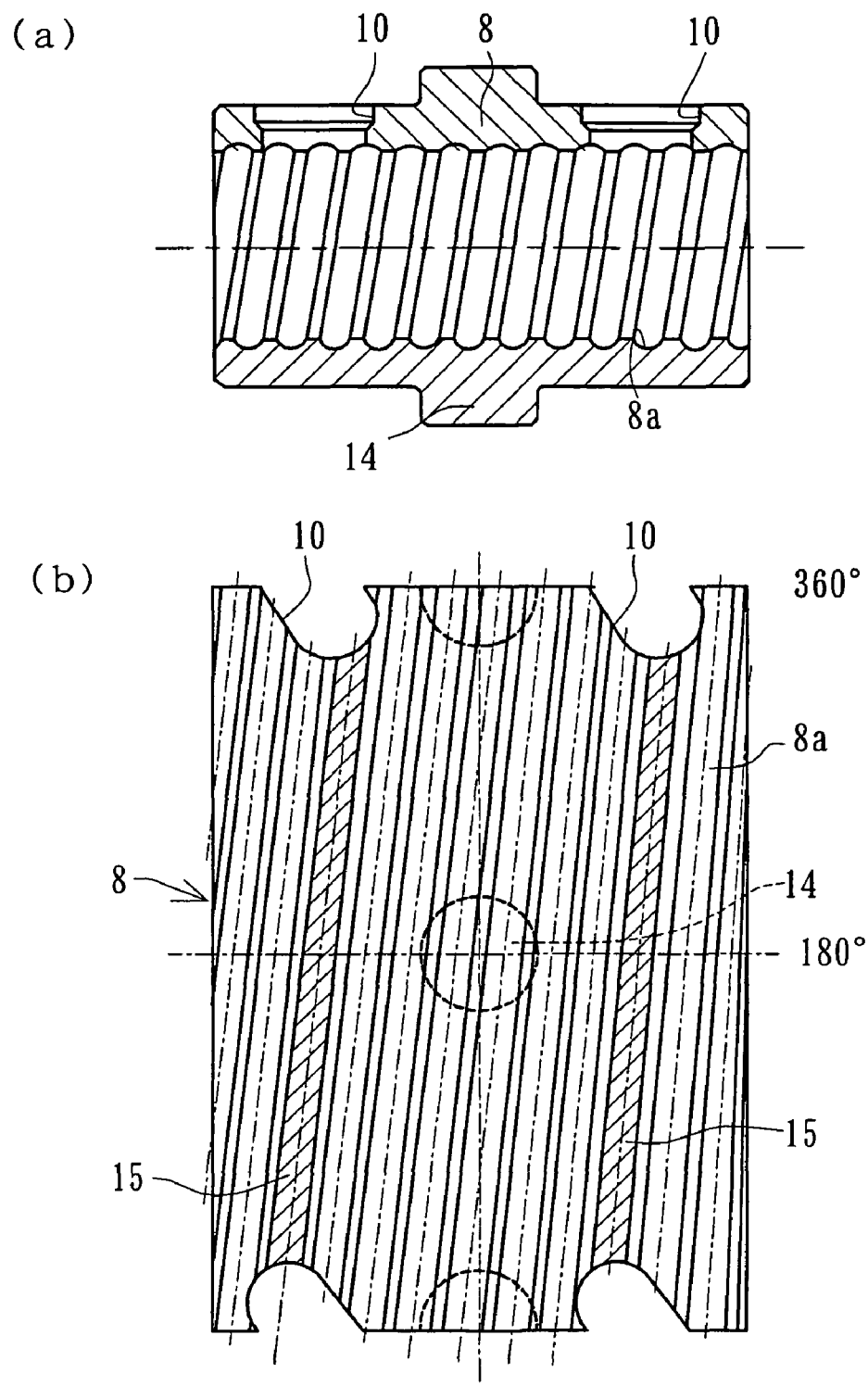
FIG. 3(a) is a longitudinal section view of a nut of FIG. 1.
FIG. 3(b) is a development view of the nut of FIG. 3(a).

According to this embodiment, a pair of bridge member 11, forming the circulating member for balls 9, are arranged so that a large distance is formed between adjacent circulating rows. As shown in FIG. 3, the bridge windows 10 are formed at opposite ends of the nut 8. At least two rows or threads of the screw groove 8a are formed between two ball circulating rows or threads 15 and 15 (shown by hatch in FIG. 3 (b)). Since the span between the ball circulating rows 15 and 15 is large, it is possible to reduce the load applied to balls entering into the circulating area by the momentum load transmitted via the supporting portion. Also, it is possible to obtain a smooth operation of the ball screw brought by the even ball load distribution and the stable ball motion.

Although it is illustrated and described the ball screw 3 in which two bridge members 11 are arranged at opposite ends of the nut 8, any other structure may be adopted in the present disclosure. For example, a ball screw where a plurality of bridge members 11 is arranged on the nut 8 at a distance more than two pitches of the screw groove 8a may be adopted. In addition, although the ball screw 3 is illustrated with the supporting shafts 14 arranged on the outer circumferential surface, it may be modified to provide pins on the links and pin holes engaging the pins on the outer circumferential surface of the nut.

Figure 4:
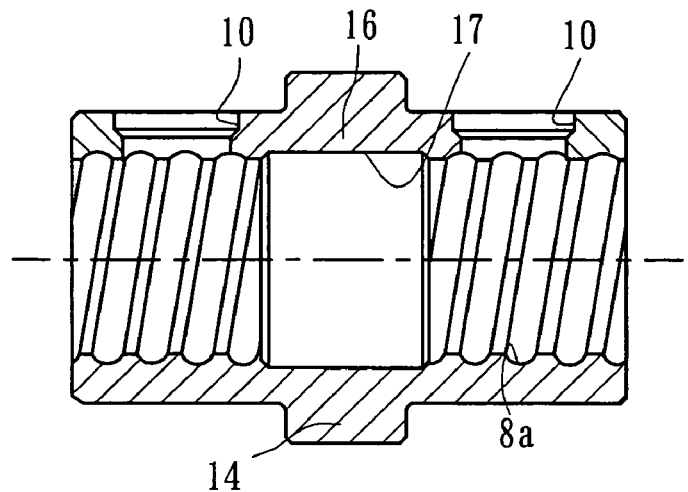
FIG. 4(a) is a longitudinal section view of a modified embodiment of the nut of FIG. 3.
FIG. 4(b) is a development view of the nut of FIG. 4(a).
Figure 4:
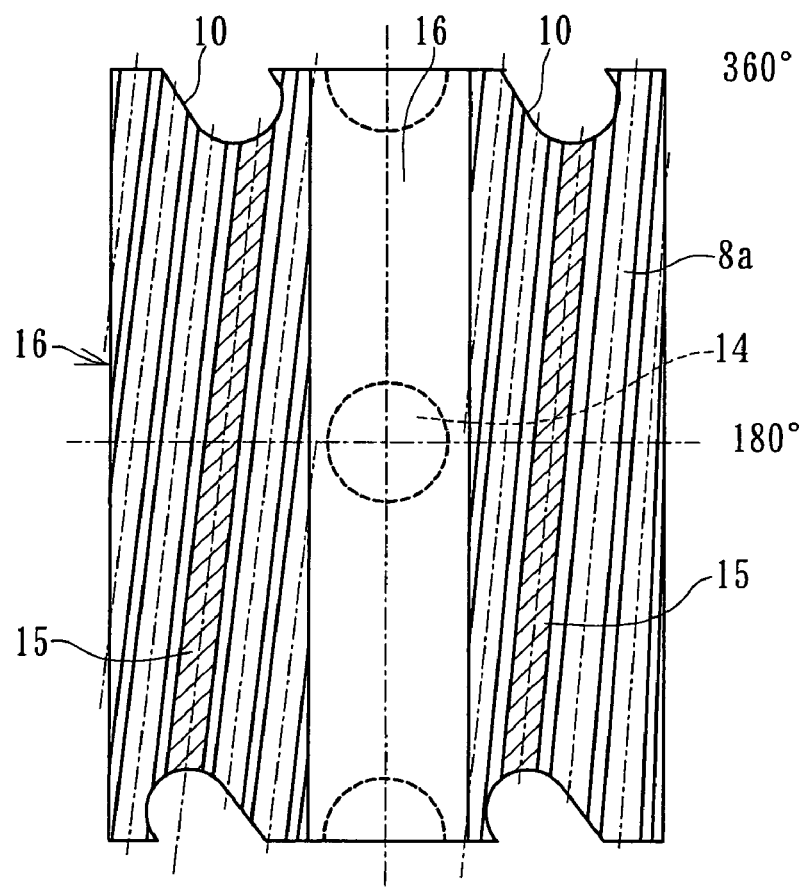
Figure 5:
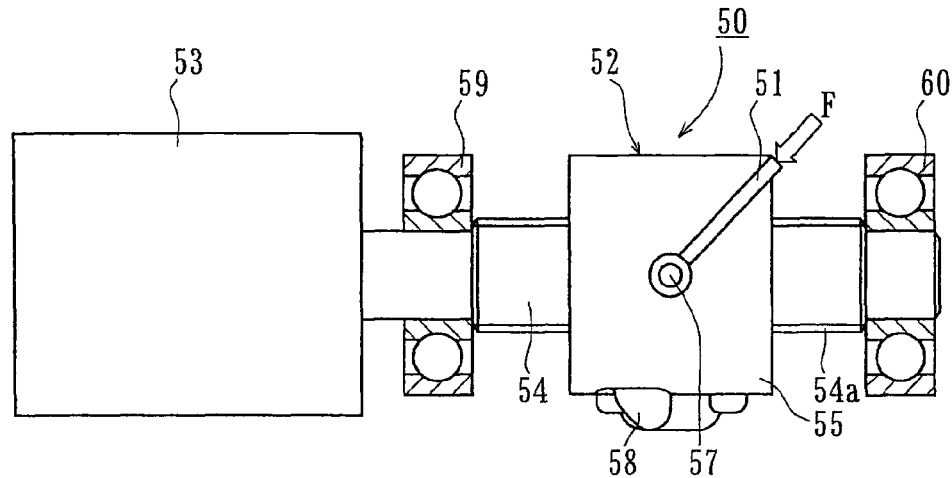
FIG. 5 is a partially sectioned elevation view of an electrically driven linear actuator of the prior art.
Figure 6:
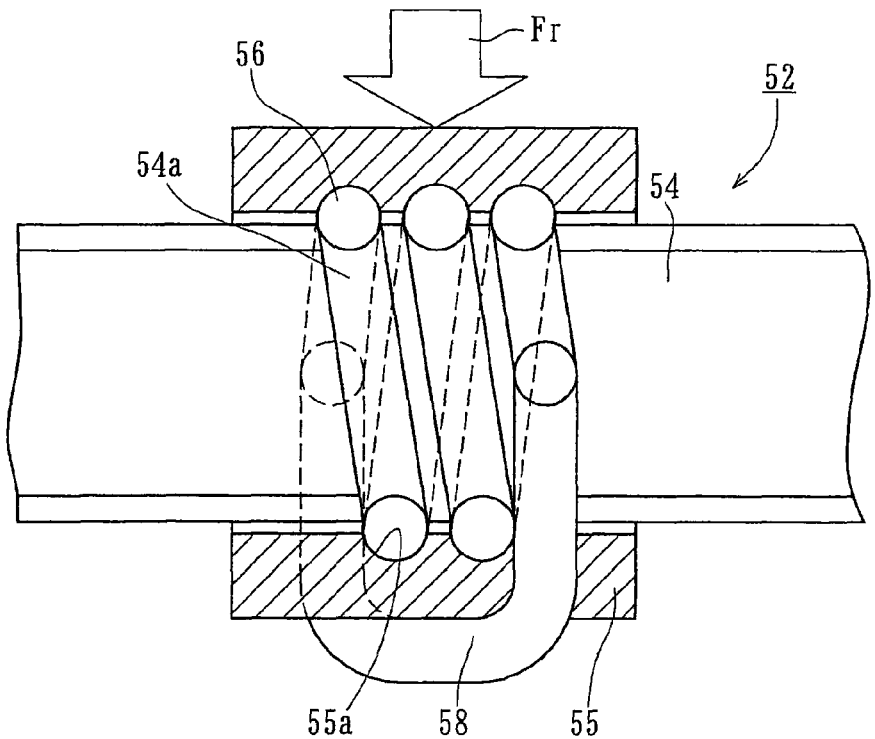
FIG. 6 is a longitudinal section view of a ball screw of FIG. 5.

Modification of the nut 8 will be illustrated in FIG. 4 as a nut 16. In this modification, the same reference numerals are used to designate similar parts in the embodiment of FIGS. 1 through 3.

In this modification, bridge windows 10 are formed in the nut 16 at its opposite ends. An annular gouged portion 17 is formed on the inner circumferential surface of the nut 16. The annular gouged portion 17, formed over a region of at least two rows or threads of the screw grooves 8a, can be formed between the two ball circulating rows 15 and 15. The inner diameter of the gouged portion 17 is set larger than that of the screw groove 8a. By setting a large span between the ball circulating rows 15 and 15, it is possible to reduce the load applied to balls entering into the circulating area by the momentum load transmitted via the supporting portion.

In this modification, the nut 16 is made from a pipe member by cutting it. The inner circumferential surface of the pipe member is cut into a predetermined inner diameter and configured prior to tapping of the screw groove 8a.

The provision of the annular gouged portion 17 between the ball circulating rows 15 and 15 of the nut 16 makes it possible to reduce the tapped area and thus extends the life of the tapping tool. Also, it is possible to reduce the tapping cycle time and thus the manufacturing cost owing to reduction of cutting resistance. In addition, it is also possible to further improve the accuracy of the screw groove 8a of the nut 16 since chips generated during the tapping process hardly enter between the tapping tool and the screw grooves. Furthermore, it is possible to ensure a sufficient space for holding lubricating grease and thus to improve the endurance of ball screw.

The present teachings can be applied to an electrically driven linear actuator with a structure including a bridge-type ball screw coaxially connected to the shaft of an electric motor and adapted to convert rotary motion of the electric motor into axial motion. A screw shaft of the ball screw is rotatably supported by one pair of bearings. However, the screw shaft is axially immovably relative to a housing of the ball screw.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or there equivalents.

What is claimed is:

1. An electrically driven linear actuator comprising:
an electric motor mounted on a housing;
a screw shaft being coaxially connected to a motor shaft of the electric motor, said shaft including a first screw groove defining a plurality of threads formed on an outer circumferential surface of said screw shaft;
a one piece nut adapted to mate with the screw shaft, the one piece nut having a wall with a substantially constant thickness along the one piece nut from the outer circumferential surface to an inner circumferential surface, said nut having a pair of supporting portions at an axially central position of the outer circumferential surface of the nut, said supporting portions engaging one end of a link, and said nut including a second screw groove in said wall defining a plurality of threads, formed on an inner circumferential surface of said nut, and corresponding to the first screw groove;

a number of balls being contained between the threads of the first and second screw grooves, a load applied onto the number of balls by said first and second screw grooves;

a pair of bridge windows in said nut, an annular gouged portion is formed, in an axial direction, between the bridge windows of the nut and the annular gouged portion is formed, in a radial inward direction, between the pair of supporting portions on the outer circumferential surface of the nut and wherein an inner diameter of the gouged portion is larger than that of the screw groove for holding lubricant and said gouged portion, in use, having a span or width formed over a region of at least two threads of said screw groove to reduce loads applied to balls entering into a circulation area between the outer circumferential surface of the screw nut and the inner circumferential surface of the nut;

a ball screw for converting rotary motion of the electric motor to an axial motion and transmitting a swing motion to the link;

a pair of supporting bearings for rotatably supporting the screw shaft but said screw shaft being axially immovable relative to the housing; and a bridge member, forming a circulating member, is fitted in each of the bridge windows.

2. An electrically driven linear actuator of claim 1 wherein the bridge members are arranged at opposite ends of the nut.

3. An electrically driven linear actuator of claim 1 wherein the screw groove of the nut is formed by tapping.

* * * * *